(12) United States Patent
Ichikawa et al.

(10) Patent No.: US 11,078,830 B2
(45) Date of Patent: Aug. 3, 2021

(54) MULTI-STAGE TURBOCHARGER

(71) Applicant: IHI Corporation, Koto-ku (JP)

(72) Inventors: Kiyomichi Ichikawa, Tokyo (JP); Yoshimitsu Matsuyama, Tokyo (JP); Munehiro Yoshida, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/674,623

(22) Filed: Nov. 5, 2019

(65) Prior Publication Data

US 2020/0063645 A1 Feb. 27, 2020

Related U.S. Application Data

(63) Continuation of application No. PCT/JP2018/014282, filed on Apr. 3, 2018.

(30) Foreign Application Priority Data

Jun. 13, 2017 (JP) .............................. JP2017-115831

(51) Int. Cl.
*F02B 37/02* (2006.01)
*F02B 37/013* (2006.01)

(52) U.S. Cl.
CPC .......... *F02B 37/025* (2013.01); *F02B 37/013* (2013.01)

(58) Field of Classification Search
CPC .... F02B 37/001; F02B 37/002; F02B 37/004; F02B 37/007; F02B 37/013; F02B 37/025; F02B 39/00
See application file for complete search history.

(56) References Cited

U.S. PATENT DOCUMENTS

| | | | |
|---|---|---|---|
| 2003/0159442 A1 | 8/2003 | Huter et al. | |
| 2004/0040300 A1 | 3/2004 | Klingel | |
| 2007/0056283 A1* | 3/2007 | Klingel | F02B 37/18 60/612 |
| 2011/0000208 A1* | 1/2011 | Robinson | F02B 37/18 60/602 |

(Continued)

FOREIGN PATENT DOCUMENTS

| | | |
|---|---|---|
| CN | 101341320 A | 1/2009 |
| CN | 101410604 A | 4/2009 |
| CN | 101600869 A | 12/2009 |

(Continued)

OTHER PUBLICATIONS

International Search Report dated May 22, 2018 in PCT/JP2018/014282 filed on Apr. 3, 2018.

(Continued)

*Primary Examiner* — Jesse S Bogue
*Assistant Examiner* — Loren C Edwards
(74) *Attorney, Agent, or Firm* — Oblon, McClelland, Maier & Neustadt, L.L.P.

(57) ABSTRACT

A multi-stage turbocharger includes a turbine housing including a first sub-housing that has a first turbine-wheel chamber and a second sub-housing that has a second turbine-wheel chamber arranged in series to the first turbine-wheel chamber, a first compressor housing coupled to the turbine housing via a first bearing housing, and a second compressor housing coupled to the turbine housing via a second bearing housing. The first sub-housing and the second sub-housing are formed integrally with each other.

6 Claims, 3 Drawing Sheets

(56) References Cited

U.S. PATENT DOCUMENTS

| | | | |
|---|---|---|---|
| 2011/0020108 A1 | 1/2011 | Axelsson et al. | |
| 2012/0093631 A1* | 4/2012 | Joergl | F01D 25/125 415/145 |

FOREIGN PATENT DOCUMENTS

| | | |
|---|---|---|
| CN | 102072011 A | 5/2011 |
| CN | 102606285 A | 7/2012 |
| CN | 102803678 A | 11/2012 |
| CN | 103180582 A | 6/2013 |
| CN | 103282619 A | 9/2013 |
| CN | 103392058 A | 11/2013 |
| CN | 104105884 A | 10/2014 |
| CN | 105715361 A | 6/2016 |
| DE | 198 22 874 A1 | 11/1999 |
| DE | 10 2005 039 756 A1 | 3/2007 |
| EP | 1 394 380 A1 | 3/2004 |
| EP | 2 363 584 A1 | 9/2011 |
| EP | 2 423 485 A1 | 2/2012 |
| JP | 60-40728 A | 3/1985 |
| JP | 2003-531996 A | 10/2003 |
| JP | 2004-92646 A | 3/2004 |
| JP | 2006-183605 A | 7/2006 |
| JP | 2010-255565 A | 11/2010 |
| JP | 2010-261362 A | 11/2010 |
| JP | 2010-281282 A | 12/2010 |
| JP | 2011-85043 A | 4/2011 |
| JP | 2011-174425 A | 9/2011 |
| WO | WO 2010/122668 A1 | 10/2010 |

OTHER PUBLICATIONS

Written Opinion of the International Searching Authority dated May 22, 2018 in PCT/JP2018/014282 filed on Apr. 3, 2018.
Combined Chinese Office Action and Search Report dated Jan. 7, 2021 in Chinese Patent Application No. 201880030166.4 , 8 pages.
Office Action dated Feb. 24, 2021 in counterpart German Application No. 11 2018 002 996.4 (with English translation).

* cited by examiner

MULTI-STAGE TURBOCHARGER

CROSS REFERENCE TO RELATED APPLICATIONS

This application is a continuation application of International Application No. PCT/JP2018/014282, now WO 2018/230108 A1, filed on Apr. 3, 2018, which claims priority to Japanese Patent Application No. 2017-115831, filed on Jun. 13, 2017, the entire contents of which are incorporated by reference herein.

BACKGROUND

1. Technical Field

The present disclosure relates to a multi-stage turbocharger that includes a plurality of turbochargers arranged in series.

2. Description of the Related Art

A multi-stage turbocharger is a turbocharging device including a plurality of turbochargers. It is known that the multi-stage turbocharger ensures a wider operating range than a turbocharging device including a single turbocharger. One of various types of multi-stage turbochargers which includes two turbochargers arranged in series to each other in a flow direction of exhaust gas is called a series multi-stage turbocharger or a series sequential twin turbocharger, for example. In a series multi-stage turbocharger, a high-pressure side (a first stage) turbocharger operates in a low speed range of an engine and a low-pressure side (a next stage) turbocharger operates in a high speed range of the engine. The operation in this manner expands the operating range.

Japanese Patent Application Laid-open No. 2011-85043 (Patent Literature 1) discloses the series multi-stage turbocharger described above. The multi-stage turbocharger of Patent Literature 1 has a bypass passage formed in a compressor casing (a compressor housing) of each turbocharger. Air sucked into the multi-stage turbocharger flows through the bypass passage and bypasses a compressor wheel. Introduction of this structure eliminates necessity of preparing a bypass passage separately from the compressor casing, and also suppresses complication of a pipe arrangement around an engine.

SUMMARY

As complication of a pipe arrangement around an engine is concerned in Patent Literature 1, an increase in the number of components in an engine room has been a long-standing problem, which prevents weight reduction of a vehicle and improvement of fuel efficiency and lowers workability at the time of assembly and repair. This problem also occurs with multi-stage turbochargers.

The present disclosure has been made in view of these circumstances, and it is an object of the present disclosure to provide a series multi-stage turbocharger that can be miniaturized while ensuring expansion of an operating range.

A first aspect of the present disclosure is a multi-stage turbocharger comprising: a turbine housing including a first sub-housing that has a first turbine-wheel chamber and a second sub-housing that has a second turbine-wheel chamber arranged in series to the first turbine-wheel chamber; a first compressor housing coupled to the turbine housing via a first bearing housing; and a second compressor housing coupled to the turbine housing via a second bearing housing, wherein the first sub-housing and the second sub-housing are formed integrally with each other.

It is possible that the turbine housing has a first intake passage and a first exhaust passage that communicate with the first turbine-wheel chamber and a second intake passage and a second exhaust passage that communicate with the second turbine-wheel chamber. It is possible that the first intake passage, the second intake passage, and the second exhaust passage are open toward a substantially same direction.

It is possible that the first sub-housing and the second sub-housing are connected to and are separated from each other via the second intake passage.

It is possible that the second intake passage is inclined with respect to a plane in which a scroll passage of the second turbine-wheel chamber extends.

It is possible that the first compressor housing and the second compressor housing are formed independently of each other.

According to the present disclosure, it is possible to provide a series multi-stage turbocharger that can be miniaturized while ensuring expansion of an operating range.

DESCRIPTION OF THE EMBODIMENTS

Figure 1:
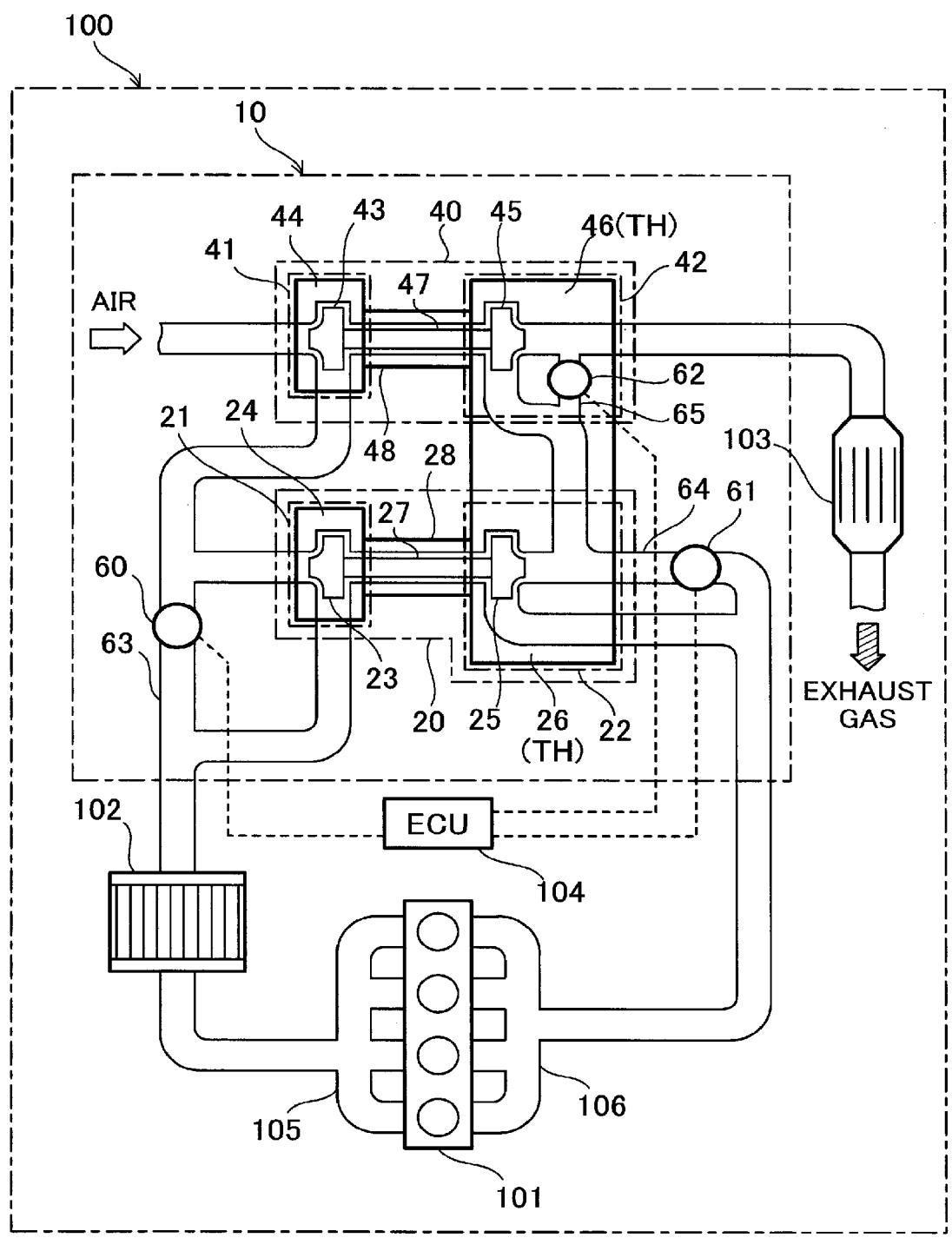
FIG. 1 is a schematic configuration diagram of a turbocharging system including a multi-stage turbocharger according to an embodiment of the present disclosure.

A multi-stage turbocharger according to an embodiment of the present disclosure will be described below with reference to the accompanying drawings. In the drawings, common parts are denoted by like reference signs and redundant explanations thereof will be omitted. FIG. 1 is a schematic configuration diagram of a turbocharging system including a multi-stage turbocharger according to the present embodiment.

A turbocharging system 10 of the present embodiment is applied to an engine system 100 illustrated in FIG. 1, for example. Therefore, the engine system 100 is described first. The engine system 100 includes the turbocharging system 10, an engine 101, an intercooler 102, a purifier 103, and an ECU (Engine Control Unit) 104. The engine system 100 is mounted on a vehicle, for example.

The engine 101 is a power source of a vehicle in which the engine system 100 is mounted. The engine 101 is an internal combustion engine, and generates power by burning mixture of air compressed by the turbocharging system 10 and fuel. Further, the engine 101 burns the mixture and supplies exhaust gas generated by combustion to the turbocharging system 10.

The intercooler 102 cools compressed air supplied from the turbocharging system 10 to the engine 101. An inlet of the intercooler 102 is connected to a first compressor (described later) 21 and a second compressor (described later) 41 of the turbocharging system 10 described later, and an outlet of the intercooler 102 is connected to the turbocharging system 10 via an intake manifold 105 of the engine 101.

The purifier 103 purifies exhaust gas discharged from the turbocharging system 10. The purifier 103 is configured by a filter that collects particulate matter and a catalyst that promotes oxidation or reduction of harmful components, for example.

The ECU 104 controls the entire engine system 100. For example, the ECU 104 controls opening and closing of an intake changeover valve (described later) 60, an exhaust changeover valve (described later) 61, and a wastegate valve (described later) 62 in the turbocharging system 10 and the opening degree of each of those valves in accordance with output of the engine 101 (for example, an engine speed or a flow rate of exhaust gas expected from the engine speed).

Next, the turbocharging system 10 is described.

The turbocharging system 10 compresses air by using exhaust gas from the engine 101 and supplies compressed air to the engine 101. As illustrated in FIG. 1, the turbocharging system 10 includes a first turbocharger (a primary turbocharger, a high-pressure stage turbocharger) 20, a second turbocharger (a secondary turbocharger, a low-pressure stage turbocharger) 40, the intake changeover valve 60, the exhaust changeover valve 61, and the wastegate valve 62. The first turbocharger 20 and the second turbocharger 40 are arranged in series to each other in a flow direction of exhaust gas. That is, the turbocharging system 10 of the present embodiment adopts a series multi-stage turbocharger.

The first turbocharger 20 is arranged on an upstream side of the second turbocharger 40 in the flow direction of exhaust gas. The first turbocharger 20 includes a first compressor (a high-pressure stage compressor) 21 and a first turbine (a high-pressure stage turbine) 22. The first turbocharger 20 may include a variable nozzle unit (not illustrated) that adjusts the rate of injection of exhaust gas toward the first turbine 22.

The first compressor 21 includes a first compressor wheel 23 and a first compressor housing 24 that accommodates therein the first compressor wheel 23 to be rotatable. The first turbine 22 includes a first turbine wheel 25 and a first turbine housing (a first sub-housing) 26 that accommodates therein the first turbine wheel 25 to be rotatable. A first shaft 27 couples the first compressor wheel 23 and the first turbine wheel 25 to each other, and is supported to be rotatable by a bearing (not illustrated). The bearing (not illustrated) is attached to a first bearing housing 28. When the first turbine wheel 25 is rotated by flow of exhaust gas, the first compressor wheel 23 is also rotated. Compressed air is generated by this rotation of the first compressor wheel 23.

The second turbocharger 40 is arranged on a downstream side of the first turbocharger 20 in the flow direction of exhaust gas, and has a larger capacity than the first turbocharger 20. The second turbocharger 40 includes a second compressor (a low-pressure stage compressor) 41 and a second turbine (a low-pressure stage turbine) 42. The second turbocharger 40 may include a variable nozzle unit (not illustrated) that adjusts the rate of injection of exhaust gas flowing toward the second turbine 42.

The second compressor 41 includes a second compressor wheel 43 and a second compressor housing 44 that accommodates therein the second compressor wheel 43 to be rotatable. The second turbine 42 includes a second turbine wheel 45 and a second turbine housing (a second sub-housing) 46 that accommodates therein the second turbine wheel 45 to be rotatable. A second shaft 47 couples the second compressor wheel 43 and the second turbine wheel 45 to each other, and is supported to be rotatable by a bearing (not illustrated). The bearing (not illustrated) is attached to a second bearing housing 48. When the second turbine wheel 45 is rotated by flow of exhaust gas, the second compressor wheel 43 is also rotated. Compressed air is generated by this rotation of the second compressor wheel 43.

Figure 2:
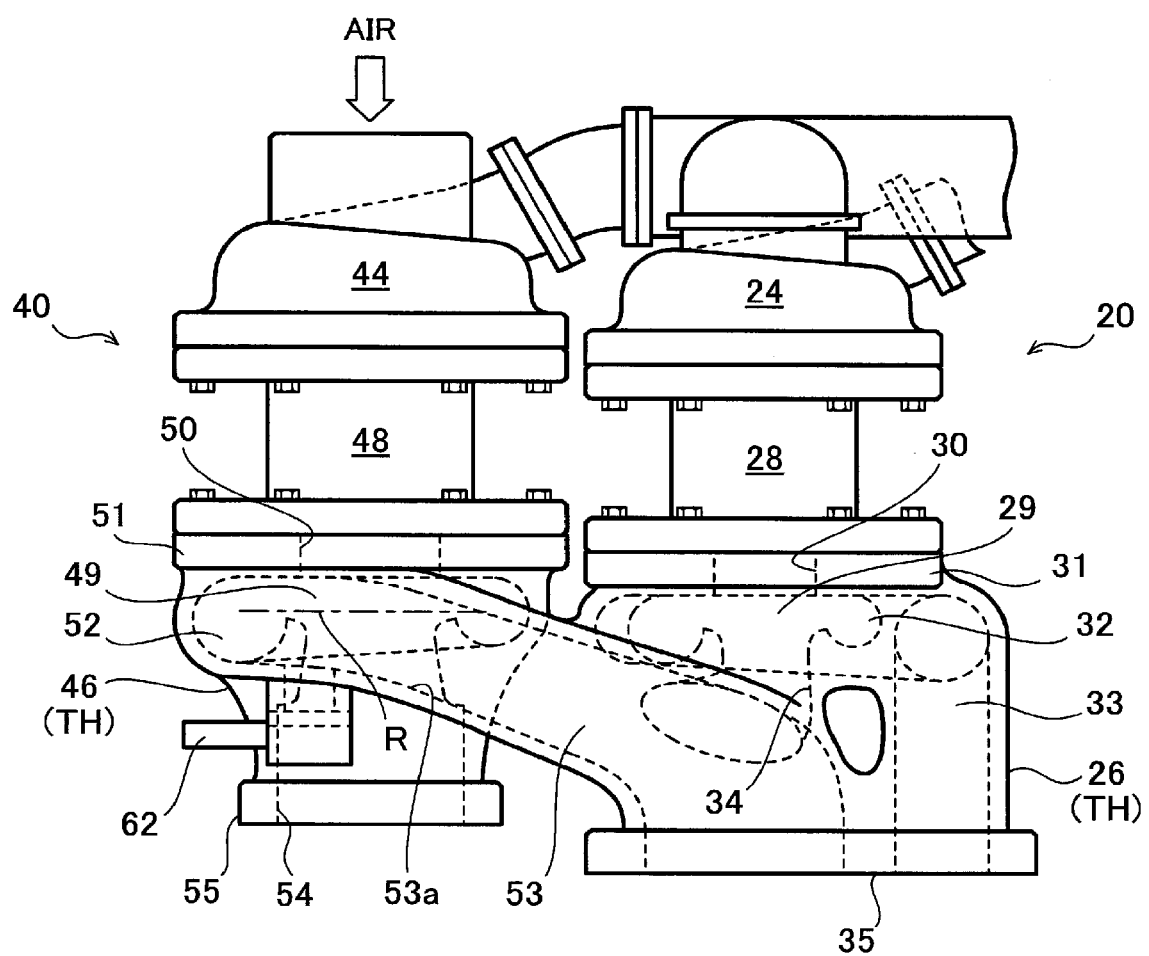
FIG. 2 is a plan view (a top view) illustrating a housing of the multi-stage turbocharger according to the present embodiment.

The first turbine housing 26 of the first turbine 22 and the second turbine housing 46 of the second turbine 42 are integrally formed as a single turbine housing TH (see FIG. 2). That is, the first turbine housing 26 and the second turbine housing 46 are connected to each other without any connection member such as a flange.

The intake changeover valve 60 is provided in a bypass passage 63 that bypasses the first compressor 21 and makes the intake side and the discharge side of the first compressor 21 communicate with each other, and opens and closes the bypass passage 63. The intake changeover valve 60 is closed while the first compressor 21 is driven. In this case, compressed air discharged from the second compressor 41 flows into the first compressor 21 to be compressed, and is supplied to the intake side of the engine 101 via the intake manifold 105.

Meanwhile, the intake changeover valve 60 is opened while the first compressor 21 is not driven. In this case, the compressed air discharged from the second compressor 41 bypasses the first compressor 21 to be supplied to the intake side of the engine 101 via the intake manifold 105. That is, the intake changeover valve 60 allows the compressed air to flow from the second compressor 41 to the engine 101 through the bypass passage 63. The intake changeover valve 60 is configured to prevent backflow of the compressed air from the engine 101 to the second compressor 41. That is, the intake changeover valve 60 also serves as a so-called check valve.

The exhaust changeover valve 61 is provided in a bypass passage 64 that bypasses the first turbine 22 and makes the intake side and the discharge side of the first turbine 22 communicate with each other, and opens and closes the bypass passage 64. While the exhaust changeover valve 61 is closed, exhaust gas discharged from the engine 101 passes through the first turbine wheel 25 of the first turbocharger 20 and is then discharged from the first turbocharger 20. As a result, the first turbine wheel 25 is rotated. The first compressor 21 compresses air by this rotation.

Meanwhile, while the exhaust changeover valve 61 is opened, the exhaust gas discharged from the engine 101 passes through the bypass passage 64, is discharged from the first turbocharger 20, and is thereafter supplied to the second turbocharger 40. In other words, the exhaust gas bypasses the first turbine wheel 25, is discharged from the first turbocharger 20, and is supplied to the second turbocharger 40. That is, the exhaust changeover valve 61 stops compression of air performed by the first compressor 21 by opening the bypass passage 64.

The wastegate valve 62 is provided in a bypass passage 65 that bypasses the second turbine 42 and makes the intake side and the discharge side of the second turbine 42 communicate with each other, and opens and closes the bypass passage 65. While the wastegate valve 62 is opened, a portion of the above exhaust gas passes through the bypass passage 65, is discharged from the second turbocharger 40, and thereafter flows into the purifier 103. In other words, a portion of the above exhaust gas bypasses the second turbine wheel 45, is discharged from the second turbocharger 40, and thereafter flows into the purifier 103. The opening degree of the wastegate valve 62 is adjusted by the ECU 105 or a turbocharge pressure of the second compressor 41.

Meanwhile, while the wastegate valve 62 is closed, exhaust gas discharged from the first turbocharger 20 or discharged through the bypass passage 64 passes through the second turbine wheel 45 of the second turbocharger 40 and is then discharged from the second turbocharger 40. As a result, the second turbine wheel 45 is rotated. The second compressor 41 compresses air by this rotation.

The opening degreed of the wastegate valve 62 is changed in accordance with a turbocharge pressure or the like required by the engine 101. That is, the opening degree of the wastegate valve 62 is changed from fully opened to fully closed. Therefore, it is possible to adjust the amount of exhaust gas flowing into the second turbine wheel 45 (that is, the number of revolutions of the second turbine wheel 45 and the second compressor wheel 43).

Figure 3:
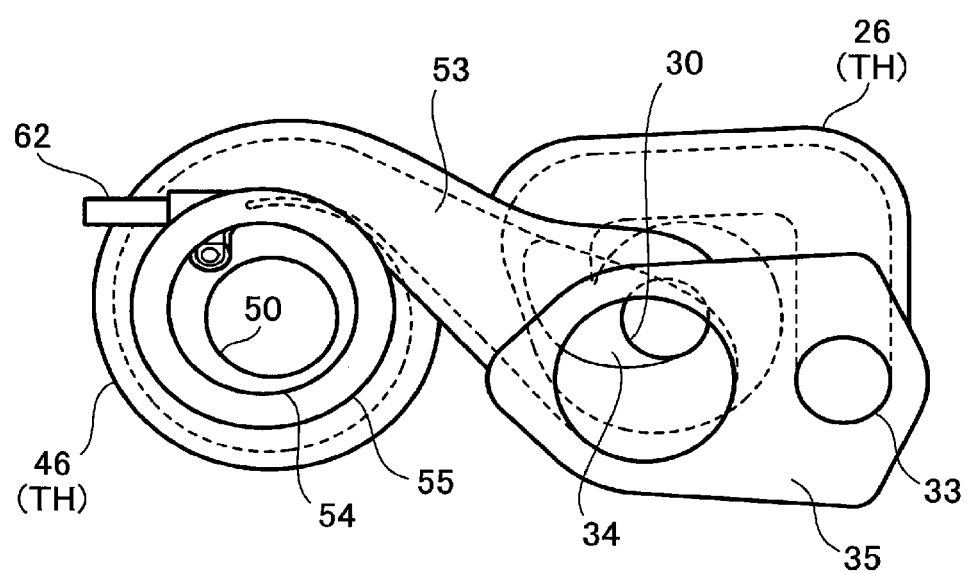
FIG. 3 is a front view illustrating a turbine housing according to the present embodiment.

Next, a housing of the multi-stage turbocharger according to the present embodiment is described. FIG. 2 is a plan view (a top view) illustrating a housing of the multi-stage turbocharger according to the present embodiment. FIG. 3 is a front view illustrating a turbine housing according to the present embodiment.

As illustrated in FIG. 2, a housing of the first turbocharger 20 is configured by the first turbine housing 26, the first compressor housing 24, and the first bearing housing 28. The first bearing housing 28 is connected to the first turbine housing 26 at one end thereof and is also connected to the first compressor housing at the other end thereof. In other words, the first compressor housing 24 is coupled to the first turbine housing 26 via the first bearing housing 28.

Similarly, a housing of the second turbocharger 40 is configured by the second turbine housing 46, the second compressor housing 44, and the second bearing housing 48. The second bearing housing 48 is connected to the second turbine housing 46 at one end thereof and is also connected to the second compressor housing at the other end thereof. In other words, the second compressor housing 44 is coupled to the second turbine housing 46 via the second bearing housing 48.

Each of the housings of the first turbocharger 20 and the second turbocharger 40 is formed by casting, for example.

As described above, the first turbine housing 26 and the second turbine housing 46 are integrally formed as a single turbine housing TH. That is, the first turbine housing 26 and the second turbine housing 46 are connected to each other without any connection member, such as a flange, and configure the turbine housing TH as a single structure.

As illustrated in FIG. 2, the first turbine housing 26 has a first turbine-wheel chamber 29. The first turbine-wheel chamber 29 has an axisymmetric shape corresponding to the shape of the first turbine wheel 25 and accommodates the first turbine wheel 25 therein. The first turbine-wheel chamber 29 has an insertion port 30 for the first turbine wheel 25. The insertion port 30 is open to a flange (a rib) 31 that faces the first bearing housing 28.

The first turbine housing 26 has a first scroll passage 32, a first intake passage 33, and a first exhaust passage 34. The first scroll passage 32 is provided on an outer periphery of the first turbine-wheel chamber 29 and communicates with each of the first intake passage 33 and the first exhaust passage 34. The first scroll passage 32 extends in a circumferential direction of the first turbine wheel 25 spirally around a symmetry axis of the first turbine-wheel chamber 29 (in other words, a rotation center axis of the first turbine wheel) as a reference. The cross-sectional area of the first scroll passage 32 gradually decreases from start of winding along a flow direction of exhaust gas.

The first intake passage 33 is connected to an end at start of winding of the first scroll passage 32 (that is, a portion having the maximum cross-sectional area). Further, the first intake passage 33 is open to a flange (a rib) 35 of the first turbine housing 26 and is connected to an exhaust manifold 106 of the engine 101. The flange 35 is located opposite to the flange 31 with the first turbine-wheel chamber 29 arranged therebetween.

The first exhaust passage 34 (one end of the first exhaust passage 34) communicates with the first turbine-wheel chamber 29 to be open toward rear edge (a trailing edge) of the first turbine wheel 25. Also, the first exhaust passage 34 (the other end of the first exhaust passage 34) communicates with a second intake passage 53 of the second turbocharger 40 inside the first turbine housing 26.

The second turbine housing 46 has a second turbine-wheel chamber 49. The second turbine-wheel chamber 49 has an axisymmetric shape corresponding to the shape of the second turbine wheel 45 and accommodates the second turbine wheel 45 therein. The second turbine-wheel chamber 49 has an insertion port 50 for the second turbine wheel 45. The insertion port 50 is open to a flange (a rib) 51 that faces the second bearing housing 48.

As described above, the turbocharging system 10 of the present embodiment adopts a series multi-stage turbocharger. Therefore, the first turbine-wheel chamber 29 of the first turbine housing 26 and the second turbine-wheel chamber 49 of the second turbine housing 46 are arranged in series to each other in the flow direction of exhaust gas in the turbine housing TH.

The second turbine housing 46 has a second scroll passage 52, the second intake passage 53, and a second exhaust passage 54. The second scroll passage 52 is provided on an outer periphery of the second turbine-wheel chamber 49 and communicates with each of the second intake passage 53 and the second exhaust passage 54. The second scroll passage 52 extends in a circumferential direction of the second turbine wheel 45 spirally around a symmetry axis of the second turbine-wheel chamber 49 (in other words, a rotation center axis of the second turbine wheel) as a reference. The cross-sectional area of the second scroll passage 52 gradually decreases from start of winding along the flow direction of exhaust gas.

The second intake passage 53 is connected to an end at star of winding of the second scroll passage 52 (that is, a portion having the maximum cross-sectional area). The second intake passage 53 extends from the second scroll passage 52 to the flange 35 of the first turbine housing 26 and is open at the flange 35. That is, the first intake passage 33 and the second intake passage 53 are open at the same flange 35. The second intake passage 53 is connected to the exhaust manifold 106 of the engine 101 via the exhaust changeover valve 61.

The second intake passage 53 is formed to be tubular, and the cross-sectional area (opening area) thereof gradually increases from the second scroll passage 52 toward the flange 35. The second intake passage 53 is not structurally divided between the second scroll passage 52 and the flange 35. That is, the second intake passage 53 does not have a joint structure (for example, a flange) for connecting the first turbine housing 26 and the second turbine housing 46 to each other.

The second exhaust passage 54 (one end of the second exhaust passage 54) communicates with the second turbine-wheel chamber 49 to be open toward a rear edge (a trailing edge) of the second turbine wheel 45. Further, the second exhaust passage 54 (the other end of the second exhaust passage 54) is open to a flange (a rib) 55 of the second turbine housing 46. The flange 55 is located opposite to the flange 51 with the second turbine-wheel chamber 49 arranged therebetween.

The wastegate valve 62 is provided in the second turbine housing 46. The bypass passage 65 is formed in an inner wall 53a of the second intake passage 53 and communicates with the second exhaust passage 54. The wastegate valve 62 opens and closes an end of the second exhaust passage 54 which is close to the second intake passage 53.

In the present embodiment, the first turbine housing (the first sub-housing) 26 and the second turbine housing (the second sub-housing) 46 are integrally formed as a single turbine housing TH. That is, a joint structure (for example, a flange) for connecting the housings to each other is not required. Therefore, a multi-stage turbocharger can be miniaturized, while ensuring expansion of an operating range.

As illustrated in FIG. 2 and FIG. 3, a pipe that configures the second intake passage 53 couples the first turbine housing 26 and the second turbine housing 46 to each other. In other words, an entrance portion of the second intake passage 53 of the second turbocharger 40 is integrated with the first turbine housing 26 of the first turbocharger 20. In this manner, the first turbine housing 26 and the second turbine housing 46 may be connected to each other and be separated from each other via the second intake passage 53. In other words, the first turbine housing 26 and the second turbine housing 46 may be provided with a gap therebetween, excluding the second intake passage 53. In this case, the second intake passage 53 serves as an elastic body and suppresses as much as possible (insulates) a mutual effect between thermal deformation of the first turbine housing 26 and thermal deformation of the second turbine housing 46 in association with flow of exhaust gas (for example, stress mixing). Further, thermal flow between the first turbine housing 26 and the second turbine housing 46 is suppressed, and therefore heat loss caused by such thermal flow is also suppressed.

In addition, the thickness of the pipe configuring the second intake passage 53 may be set to be as small as possible, as long as it maintains coupling between the first turbine housing 26 and the second turbine housing 46 and also maintains prevention of leakage of exhaust gas. The heat capacity of the pipe decreases as the thickness of the pipe is smaller. Therefore, it is possible to suppress heat loss of exhaust gas that flows in at least the second intake passage 53.

The flange 35 and the flange 55 may be located in parallel to each other, as illustrated in FIG. 2 and FIG. 3. That is, the first intake passage 33, the second intake passage 53, and the second exhaust passage 54 may be open toward the same direction. The above term "same" described here means "mostly same", in other words, "substantially same", and it is not necessary that they are open toward strictly the same direction. In this case, the ratio of relevant members of the respective passages arranged in the direction toward which the respective passages are open is increased, and thus workability is improved.

As illustrated in FIG. 2, the second intake passage 53 may be inclined with respect to a plane R in which the second scroll passage 52 extends. The plane R is, for example, a plane perpendicular to the symmetry axis of the second turbine-wheel chamber 49. Since it is possible to avoid a sharp deflection of the flow direction of exhaust gas that flows to the second scroll passage 52 via the second intake passage 53, reduction of turbine efficiency can be suppressed.

As illustrated in FIG. 2, the first compressor housing and the second compressor housing 44 may be formed independently of each other. In this case, it is desirable that a pipe that connects the first compressor housing 24 and the second compressor housing 44 to each other has a structure that provides flexibility. As described above, the first turbine housing 26 and the second turbine housing 46 are thermally deformed in association with flow of exhaust gas. By forming the first compressor housing 24 and the second compressor housing 44 independently of each other, it is possible to suppress generation of new stress caused by deformation of each turbine housing that is different in degree between the turbine housings.

The present disclosure is not limited to the embodiment described above and is defined in the descriptions of the scope of claims, and the present disclosure includes all sorts of modifications with equivalent meanings and within the scope of the descriptions in the scope of claims.

What is claimed is:

1. A multi-stage turbocharger comprising:
    a turbine housing including a first sub-housing that has a first turbine-wheel chamber and a second sub-housing that has a second turbine-wheel chamber arranged in series to the first turbine-wheel chamber;
    a first compressor housing coupled to the turbine housing via a first bearing housing; and
    a second compressor housing coupled to the turbine housing via a second bearing housing, wherein
    the first sub-housing and the second sub-housing are formed integrally with each other,
    the first sub-housing and the second sub-housing are connected to and are separated from each other via a second intake passage,
    the turbine housing includes
        a first intake passage and a first exhaust passage that communicate with the first turbine-wheel chamber and the second intake passage, and
        a second exhaust passage that communicates with the second turbine-wheel chamber,
    an intake side of the first intake passage, an intake side of the second intake passage, and a discharge side of the second exhaust passage are open toward a substantially same direction,
    the first sub-housing includes a first flange on which the intake side of the first intake passage and the intake side of the second intake passage are open, and
    the second sub-housing includes a second flange on which the discharge side of the second exhaust passage.

2. The multi-stage turbocharger according to claim 1, wherein the second intake passage is inclined with respect to a plane in which a scroll passage of the second turbine-wheel chamber extends.

3. The multi-stage turbocharger according to claim 2, wherein the first compressor housing and the second compressor housing are formed independently of each other.

4. The multi-stage turbocharger according to claim 1, wherein the first compressor housing and the second compressor housing are formed independently of each other.

5. The multi-stage turbocharger according to claim 1, wherein the first exhaust passage communicates with the second intake passage inside the first sub-housing.

6. The multi-stage turbocharger according to claim 1, wherein a cross-sectional area of the second intake passage gradually decreases from the first flange toward a scroll passage of the second sub-housing.

* * * * *